United States Patent [19]

Podlas

[11] 4,035,195

[45] July 12, 1977

[54] CROSSLINKING CELLULOSE POLYMERS

[75] Inventor: Thomas J. Podlas, Newark, Del.

[73] Assignee: Hercules Incorporated, Wilmington, Del.

[21] Appl. No.: 603,828

[22] Filed: Aug. 11, 1975

[51] Int. Cl.² .......................................... C08L 1/26
[52] U.S. Cl. ................................................ 106/194
[58] Field of Search .................... 106/194; 260/226

[56] References Cited

U.S. PATENT DOCUMENTS 3,804,174  4/1974  Chatterji ............................ 106/194

OTHER PUBLICATIONS

Cellulose & Cellulose Derivatives – pp. 901, Second Ed. Ott et al. 1954.

*Primary Examiner*—Theodore Morris
*Attorney, Agent, or Firm*—William S. Alexander

[57] ABSTRACT

Thickened aqueous solutions are prepared by crosslinking carboxymethyl hydroxyethyl cellulose solutions in brine via polyvalent metal ions. The CMHEC employed is characterized by specified carboxymethyl and hydroxyethyl substitution levels.

6 Claims, No Drawings

CROSSLINKING CELLULOSE POLYMERS

This invention relates to the preparation of viscous aqueous brine solutions. In a specific embodiment, it relates to the preparation of such solutions containing relatively high concentrations of inorganic salt material and relatively low concentrations of a water-soluble cellulose ether.

In the initial phases of petroleum recovery, crude oil is forced out of the oil-bearing formation to a well hole and upwards by natural forces existing in the formation such as, e.g., natural gas pressure, and is brought to the surface by a combination of those natural forces and pumping. As recovery by this method begins to diminish, the well can be stimulated, as, e.g., by fracturing, to assist production by the natural forces. In most cases, however, a maximum of about 25% of the available crude oil in the formation is recovered by this technique before the natural forces are exhausted. At this point, post-primary recovery techniques are employed to supplement the natural pressure with pressure from the surface.

The secondary recovery of oil from oil-bearing or containing subterranean formations is accomplished by fluid drive processes wherein a fluid is injected into the formation via one or more injection wells to drive the oil through the formation to one or more production walls. Fluids used in such processes include liquids, such as water and various hydrocarbons, and gases such as hydrocarbon gases, carbon dioxide, etc. Many oil reservoirs comprise layers or zones of porous rock which can vary in permeability from more than 1,000 millidarcys to less than 10 millidarcys. In all fluid drive processes a recognized problem is the predilection of the drive fluid to channel along or through the more permeable zones of the formation. This is commonly referred to as fingering. The more conductive zones, after the oil has been largely displaced therefrom, function as "thief zones" which permit the drive fluid to channel directly from injection to production wells. In many instances such channeling or fingering results in leaving substantial quantities of oil in the less permeable zones of the formation which are bypassed. Such channeling or fingering is most pronounced when the mobility, i.e., the ratio of the reservoir's permeability to the drive fluid to the viscosity of the drive fluid, is large relative to the mobility of the oil in the reservoir.

In order to eliminate or to minimize the tendency toward fingering, it has been proposed to add to the flood water a watersoluble polymer to thicken the flood water. In a typical method of application, the thickened solution is pumped into the injection well for a period of time sufficient to form the zone of polymer solution. This polymer containing zone is then followed with an additional flood of water or brine. The polymer containing zone is referred to as a mobility buffer as it is intended to form a buffer of low mobility between the oil and the high mobility water flood. The polymer contemplated for use as the mobility buffer desirably will meet several criteria: (a) it must be capable of substantially increasing the viscosity of water or brine solutions at relatively low levels of polymer, desirably about 3000 parts per million or less; (b) it must be soluble in brine inasmuch as pure water is seldom available at the drilling site; and (c) the viscosity generated by the polymer must be stable over long periods of time to relatively high temperatures and to the high levels of shear encountered in going through the microporous oil-bearing formation. To date, the most popular polymers for these applications have been the polyacrylamides and the biopolymers such as, for example, xanthan gum. While each of these materials has its own unique advantages, each is also subject to some very significant disadvantages. The acrylamide copolymers, for example, are readily available in large quantities and at relatively favorable prices but they are highly sensitive to shear and are easily degraded by the shearing forces referred to above. Moreover, they are not readily soluble in mineral salt (brine) solutions which are frequently encountered in oil fields. The xanthan gums produce very high viscosities at very low polymer levels and are stable to the conditions encountered in post-primary oil recovery but they are in very limited supply and they are quite expensive. They also are usually contaminated with several percent of insoluble material which can interfere with their flow through porous formations and can even plug the formations to the detriment of further oil recovery therefrom.

Due to their ready availability and their favorable price structure the water-soluble cellulose ethers have been suggested as viscosity builders in this application. However, the cellulosics have not received much attention due to the fact that they are of low molecular weight such that they cannot generate the viscosities required in this application at the concentration levels which the economics of the situation dictate. In order to develop the viscosities required, it is necessary to crosslink the cellulosic polymers and the only water-soluble cellulosic polymer which is readily and inexpensively crosslinkable is carboxymethyl cellulose (CMC). Thus, only CMC has been regarded as a serious candidate. CMC, however, is known to be of very low solubility in brine solutions and crosslinked solutions of CMC in brine are so contaminated with gel slugs and precipitated or undissolved material as to be unsuitable for use as mobility buffers in oil recovery techniques.

The use of polyvalent metal cations to effect crosslinking of carboxymethylated cellulose and derivatives is known. See, e.g., U.S. Pat. Nos. 3,800,872 and 3,727,687 to Friedman and to Clampitt et al, respectively. Both of these references make the point that these derivatives cannot be reacted with such cations to form stable, high viscosity solutions except by taking certain precautions to control the rate of reaction. Thus, Clampitt et al teaches that trivalent chromium ion must be generated in situ by the reduction of a higher valence form (e.g., hexavalent) to the trivalent state or a stable solution will not be formed. Friedman, dealing only with CMC in soft water, suggests that such a limitation is not required at low concentrations, but that a Lewis base must be present as an activator and the activator does not permit formation of a stably thickened solution except over a substantial period of time.

In accordance with this invention, it has been found that thickened solutions of a cellulose ether in brine can be prepared from carboxymethyl hydroxyethyl cellulose (CMHEC) by treating a specific carboxymethyl hydroxyethyl cellulose with a polyvalent metal cation derived from a salt of such a metal containing that metal cation in the same valence form. More specifically, the carboxymethyl hydroxyethyl cellulose must be one in which the D.S. is about 0.2 to 0.6 and the hydroxyethyl M.S. is at least about 1.5.

The term "increased viscosity" or the term "thickened" as used hereinafter in these descriptions with reference to solutions of crosslinked materials is intended to mean any increase in the viscosity of a solution of the polymer even up to the point where it is no longer flowable. Solutions can be prepared covering a wide range of viscosities depending upon the application intended.

The term "solution" is intended to include not only true molecular solutions but also dispersions of the polymer wherein the polymer is so highly hydrated as to cause the dispersion to be visually clear and which contain essentially no visible particulate matter. The term "soluble" has a meaning consistent with these meanings of solution.

As used herein, the term "brine" is intended to include any aqueous solution of mineral salts having greater than about 1,000 ppm solids content, such as are frequently present in oil fields. Oil field brines commonly contain varying amounts of, e.g., sodium chloride, calcium chloride or magnesium salts. Also flooding solutions are frequently modified by addition of potassium chloride to stabilize the subsurface clay. Accordingly, potassium chloride is also freqently encountered.

The carboxymethyl hydroxyethyl cellulose employed in practice of this invention must meet critical limits as to the substitution levels of the two etherification substituents. The carboxymethyl D.S. must be between about 0.2 and 0.6 while the hydroxyethyl M.S. must be at least about 1.5. The designation "D.S." is intended to refer to the degree of substitution, i.e., the average number of hydroxyl groups per cellulosic anhydroglucose unit which are substituted with carboxymethyl groups. The designation "M.S." is intended to refer to the number of moles of hydroxethyl groups present per cellulosic anhydroglucose unit.

The limits specified are critical in order that the CMHEC will be both soluble in brine solutions and crosslinkable to the appropriate degree. Thus, if the carboxymethyl D.S. is below the specified 0.2 level, the polymer cannot be crosslinked to any significant extent. If the carboxymethyl D.S. exceeds 0.6, the product starts to assume too much ionic character and the metal cation concentration to effect thickening becomes so critical that within a very narrow range of cation concentration, the system goes from one which will not thicken to one which crosslinks to an unstable, syneresing solid gel in a short time. Also the solubility of the CMHEC in brine decreases radically as the carboxymethyl D.S. increases above 0.6. Likewise, hydroxyethyl M.S. below 1.5 is insufficient to assure brine solubility.

To carry out the process of the invention, the CMHEC in brine solution is crosslinked via a polyvalent metal cation derived from a water-soluble salt of said polyvalent metal in which the metal is in the same cationic valence state as the crosslinking species. By this, it is intended to mean that the metal ion which forms the crosslinkage need not be freshly formed as by the reduction from a higher valence state as taught by Clampitt et al. Substantially any cationic metal ion can be employed. Among these are, e.g., iron, aluminum, chromnium and zirconium. The best results are obtained with aluminum and trivalent chromium.

The polyvalent metal cation, as stated, is derived from a water-soluble salt. For reasons not germane to this invention, all salts of a particular metal are not equally effective as vehicles for providing the polyvalent cation. Thus, in using some metals, some experimentation may be required to optimize the metal salt selection. In the case of chromium and aluminum, the best salts to use are the sulfates, nitrates, and perchlorates.

It is an unexpected discovery that CMHEC as defined herein can be used to thicken brine solutions in the manner taught since it has, to a significant degree, the chemical characteristics of conventional CMC. Also quite surprising is the discovery that thickening can be accomplished at levels of the crosslinked CMHEC lower than are required to thicken pure water with crosslinked conventional CMC. Thus, with conventional CMC, thickening even in pure $H_2O$ does not take place readily at concentrations lower than about 0.2%. At such low levels, the CMC, upon cross-linking to a water-insoluble state, frequently precipitates in the form of gel particles with no thickening at all taking place. This result is not observed with CMHEC in brine solutions.

Thickening can be accomplished using the CMHEC described herein at levels as low as about 0.025% by weight. The preferred concentration level is about 0.025 to 1% and more preferred is 0.025 to 0.4%. The amount required to achieve a predetermined amount of thickening will be determined by such factors as the molecular weight of the cellulose backbone and the ratio of carboxymethyl groups to crosslinking cations.

In carrying out the process of the invention, the concentrations of the ingredients to be used are a complex function of several parameters. Initially, the viscosity of a solution of uncrosslinked CMHEC will vary according to the molecular weight of the cellulose which has been etherified. Thus, the first consideration is that a high molecular weight CMHEC will produce the desired viscosity at a lower concentration than will one of lower molecular weight. The second important consideration is that the greater the number of crosslinkages in a molecule, the higher will be the viscosity of a solution of that molecule. Thus, the second parameter of importance is the number of crosslinkages per molecule. This will be indicated hereinafter by the mole ratio of metal ions to carboxyl groups. The optimum metal ion/COOH mole ratio to produce a given viscosity varies inversely with the carboxymethyl D.S. of CMHEC.

The metal to carboxyl mole ratio values are also dependent on the initial solution viscosity, i.e., the polymer molecular weight. Thus, a polymer whose 1% solution in brine is greater than, e.g., 2500 cps, will require a higher ratio while a polymer with lower viscosity will require a higher ratio.

For most polymers and for most solutions, a chromium to carboxyl mole ratio between about 0.05 and 1.00 is satisfactory.

For post primary oil recovery applications, a thickened solution is needed which will not set to a gel over a period of several months. At the same time, it must be capable of withstanding conditions encountered in underground formations for long periods without undue degradation of the crosslinkages, depolymerization of the polymer or other type of loss of the desirable viscosity brought about by the treatment according to the invention. This invention provides a method of accomplishing both of these objectives.

It is also frequently desirable to delay the onset of viscosity buildup or to slow the rate of buildup so that the solution can be transferred to its point of use prior to its becoming too thick to be readily pumped. This can be accomplished by having a very low crosslinking metal ion concentration if a relatively low ultimate viscosity is desired. If it is desired to have a higher viscosity ultimately, the rate of thickening can be retarded by the addition of a chelating buffer to a solution having a higher metal ion concentration. The buffer chelates the metal ion, making it available over a period of time.

The expression "brine" is intended to include inorganic ionic salt solutions generally. In most applications and in most of the examples set forth hereinafter, $CaCl_2$, NaCl and/or KCl solutions are employed. In practical applications, such as the post-primary petroleum recovery operations cited above, the naturally occurring brine which is encountered will be predominantly NaCl or KCl but a great number of other salts are almost always present.

The invention is illustrated by the following examples. Parts and percentages are by weight unless otherwise noted. All viscosities are measured by means of the conventional Brookfield viscometer. In the case of 0.1% solutions a No. 2 spindle at 60 r.p.m. was employed. Reference in the examples to "weak brine" indicates a 2% $NaCl.0.5\%$ $CaCl_2.H_2O$ solution.

EXAMPLE 1

This example illustrates the criticality of the substitution levels specified above for the CMHEC employed in this invention.

A series of CMHEC's of different composition were added to weak brine at 0.1% concentration and their solubility crosslinking characteristics with chromium ion were noted.

| CMHEC | | Cr Salt | Cr/COO Ratio (molar) | Result |
|---|---|---|---|---|
| CM (D.S.) | HE (M.S.) | | | |
| 0.65 | 2.5 | $CrK(SO_4)_2 . 12H_2O$ | 0.08 | No thickening |
| " | " | " | 0.10 | Immobile gel in 3 days |
| " | " | Perchlorate | 0.08 | No thickening |
| " | " | " | 0.11 | Immobile gel in 7 days |
| 0.60 | 2.7 | $CrK(SO_4)_2 . 12H_2O$ | 0.11 | Viscosity increase from 7 to 38 cps in 3 days |
| " | " | Perchlorate | 0.16 | Viscosity increase from 7 to 325 cps in 3 days |
| 0.26 | 2.35 | $CrK(SO_4)_2 . 12H_2O$ | 0.32 | Viscosity increase from 7 to 450 cps in 3 days |
| 0.07 | 2.50 | " | | No thickening |
| 0.27 | 3.1 | — | — | Very poor solution, large amount of undissolved material |
| 0.3 | 0.7 | — | — | Insoluble |
| 0.4 | 0.3 | — | — | " |
| 0.34 | 1.87 | — | — | Clear solution, free of insolubles |
| 0.21 | 1.4 | — | — | Cloudy solution with sufficient insolubles to cause cloudiness |

EXAMPLE 2

A CMHEC having 0.25 carboxymethyl D.S. and 2.3 hydroxyethyl M.S. was dissolved in a weak brine to form a 0.25% solution which had a viscosity of 28 cps. To this was added enough of a 5% solution of $CrK(SO_4)_2.12H_2O$ so that the chromium to carboxyl mole ratio was 0.14. Viscosity readings over a one-month period were as follows:

| 1 day | — | 520 cps. |
|---|---|---|
| 2 days | — | 740 cps. |
| 3 days | — | 972 cps. |
| 11 days | — | 1288 cps. |
| 17 days | — | 1256 cps. |

EXAMPLE 3

A 0.5% stock solution in weak brine of a CMHEC having 0.27 carboxymethyl D.S. and 2.4 hydroxyethyl D.S. was prepared. Its viscosity was 280 cps. This was crosslinked with a 3.2% $Al_2(SO_4)_3 . 18H_2O$ solution buffered with citric acid. The citrate to aluminum mole ratio was 0.4 and the aluminum to carboxyl mole ratio was 0.13. Periodic viscosity measurements after crosslinking:

| 1 day | — | 1600 cps. |
|---|---|---|
| 3 days | — | 1640 cps. |
| 6 days | — | 1500 cps. |
| 22 days | — | 1228 cps. |
| 50 days | — | 1360 cps. |

EXAMPLE 4

A 0.1% solution of the polymer used in Example 2 was made up in weak brine. Its viscosity was 5 cps. To this was added enough of a 5% solution of $Cr(ClO_4)_3.6H_2O$ so that the chromium to carboxyl mole ratio was 0.44. Periodic viscosity measurements after crosslinking:

| 1 day | — | 48 cps. |
|---|---|---|
| 3 days | — | 141 cps |
| 22 days | — | 165 cps. |
| 79 days | — | 145 cps. |

EXAMPLE 5

Example 4 was repeated using the CMHEC from Example 2 at 0.51 chromium to carboxyl mole ratio. The uncrosslinked solution had a viscosity of 6 cps. Periodic viscosity measurements after crosslinking:

| 1 day | — | 12 cps. |
|---|---|---|
| 3 days | — | 18 cps. |
| 22 days | — | 52 cps. |
| 79 days | — | 55 cps. |

EXAMPLE 6

A 0.1% solution of CMHEC having 0.36 carboxymethyl D.S. and 2.09 hydroxyethyl M.S. was prepared in weak brine. Its viscosity was 9 cps. It was crosslinked with $Cr(ClO_4)_3 \cdot 6H_2O$ at chromium to carboxyl mole ratio of 0.20. Periodic viscosity measurements after crosslinking:

| | | |
|---|---|---|
| 1 day | – | 16 cps. |
| 3 days | – | 79 cps. |
| 17 days | – | 100 cps. |
| 32 days | – | 98 cps. |

Example 7

A 0.1 % solution of CMHEC having 0.25 carboxymethyl D.S. and 2.33 hydroxyethyl D.S. was prepared in weak brine and had a viscosity of 12 cps. To this was added sufficient $Cr(NO_3)_3 \cdot 9H_2O$ to yield a chromium to carboxyl mole ratio of 0.20. Periodic viscosity measurements were as follows:

| | | |
|---|---|---|
| 1 day | – | 5 cps. |
| 2 days | – | 29 cps. |
| 5 days | – | 76 cps. |
| 10 days | – | 85 cps. |
| 14 days | – | 86 cps. |
| 22 days | – | 89 cps. |

Example 8

Example 7 was repeated using a CMHEC of 0.34 carboxymethyl D.S. and 1.87 hydroxyethyl D.S. and sufficient $Cr(NO_3)_3 \cdot 9H_2O$ to yield chromium to carboxyl mole ratio of 0.36. Periodic viscosity measurements:

| | | |
|---|---|---|
| 1 day | – | 150 cps. |
| 3 days | – | 230 cps. |
| 5 days | – | 250 cps. |
| 7 days | – | 250 cps. |
| 21 days | – | 250 cps. |

EXAMPLE 9

To demonstrate the reduction in mobility of a brine solution containing crosslinked CMHEC prepared according to this invention, mobility measurements were determined on a 0.025% solution in weak brine of a CMHEC having 0.36 carboxymethyl D.S. and 2.09 hydroxyethyl M.S. crosslinked with $Cr(NO_3)_3 \cdot 6H_2O$ at a Cr/COO mole ratio or 0.26.

Mobility tests were carried out on Berea sandstone cores one inch in diameter by four inches long. Mobility values were determined via Darcy's law: $M = (QL/A\Delta P)$ where $M$ is mobility, $Q$ is the flow rate through the core, $L$ is the length of the core, $A$ is the cross-sectional area and $\Delta P$ the pressure drop across the core.

The following measurements were made:

1. Weak brine is pumped through the core and its mobility was calculated.
2. The polymer solution in weak brine was pumped through the same core and after a liquid volume equal to five times the pore volume of the core had been pumped through, mobility of the polymer solution $M_p$ was determined. The ratio $M_p/M_o$, or relative mobility was then calculated.

Relative mobility of the solution according to this invention was 0.27, whereas that of a commonly used polyacrylamide in the same type core was 0.50.

What I claim and desire to protect by Letters Patent is:

1. A method of preparing a thickened aqueous brine solution which comprises providing an aqueous solution of at least about 0.025% by weight of carboxymethyl hydroxyethyl cellulose and crosslinking said carboxymethyl hydroxyethyl cellulose in solution with a polyvalent metal cation, said carboxymethyl hydroxyethyl cellulose being one wherein the carboxymethyl D.S. is between about 0.2 and 0.6 and the hydroxyethyl M.S. is between about 1.5 and 3.0, and said polyvalent metal cation being provided in the form of a salt wherein said metal cation is present in the same cationic valence state as the crosslinking species, and the mole ratio of said polyvalent metal cation to carboxyl groups being between about 0.02 and 1.

2. The method of claim 1 wherein the carboxymethyl hydroxyethyl cellulose concentration is between 0.025 and 1%.

3. The method of claim 1 wherein the carboxymethyl hydroxyethyl cellulose concentration is between about 0.025 and 0.4%.

4. The method according to claim 3 wherein the polyvalent metal ion is trivalent chromium or aluminum.

5. The method of claim 4 wherein the mole ratio of metal ions to carboxyl groups is about 0.05 to 1.

6. The method of claim 4 wherein the polyvalent metal ion is trivalent chromium derived from a chromium salt selected from the class consisting of chromium perchlorate, chromium nitrate and chromium potassium sulfate.

* * * * *